(12) United States Patent  
Mathews et al.

(10) Patent No.: US 12,477,293 B2
(45) Date of Patent: Nov. 18, 2025

(54) MULTI-SENSOR SYSTEMS AND METHODS FOR PROVIDING IMMERSIVE VIRTUAL ENVIRONMENTS

(71) Applicants: RENSSELAER POLYTECHNIC INSTITUTE, Troy, NY (US); Jonathan Mathews, Troy, MI (US); Jonas Braasch, Latham, NY (US); Richard J. Radke, Slingerlands, NY (US); Gyanendra Sharma, Foster City, CA (US); Devavrat Jivani, Woburn, MA (US)

(72) Inventors: Jonathan Mathews, Troy, NY (US); Jonas Braasch, Latham, NY (US); Richard J. Radke, Slingerlands, NY (US); Gyanendra Sharma, Foster City, CA (US); Devavrat Jivani, Woburn, MA (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 18/715,456

(22) PCT Filed: Dec. 1, 2022

(86) PCT No.: PCT/US2022/051474
§ 371 (c)(1),
(2) Date: May 31, 2024

(87) PCT Pub. No.: WO2023/102089
PCT Pub. Date: Jun. 8, 2023

(65) Prior Publication Data
US 2024/0422495 A1 Dec. 19, 2024

Related U.S. Application Data

(60) Provisional application No. 63/284,988, filed on Dec. 1, 2021.

(51) Int. Cl.
*H04S 7/00* (2006.01)

(52) U.S. Cl.
CPC .............. *H04S 7/30* (2013.01); *H04S 2400/11* (2013.01)

(58) Field of Classification Search
CPC ......... G06F 3/162; G06F 16/683; G06F 16/40
(Continued)

(56) References Cited

U.S. PATENT DOCUMENTS 11,778,374 B2 * 10/2023 Olsson ..................... G06N 3/08
381/92
2008/0270332 A1 * 10/2008 Rudolf ................ G06F 18/2135
706/14

(Continued)

FOREIGN PATENT DOCUMENTS

JP    2020520565 B2    7/2020
KR    101761312 B1    12/2012

OTHER PUBLICATIONS

International Search Report and Written Opinion from the U.S. International Searching Authority in application No. PCT/2022/051474, mailed Mar. 16, 2023.

*Primary Examiner* — Alexander Krzystan
(74) *Attorney, Agent, or Firm* — Barclay Damon LLP; Anthony P. Gangemi (57) ABSTRACT

A time-of-flight (TOF) array including a plurality of cameras is positioned with a coplanar Higher Order Ambisonics (HOA) array including a plurality of microphones above a target area such as a room or space for analyzing speaker activity in that area. The HOA microphone array iteratively samples sound energy level frames captured by the microphones to identify a sound vector associated with the global maximum energy level in the sound energy level frame. This sound vector is fused with the data from the TOF camera array that identified the positions of sound sources in the (Continued)

target area to associate produced sound corresponding with the sound vector with a physical active sound source in the target area. A beamformer can then be used to save audio corresponding to the sound vector and discard audio not associated with the sound vector to produce a sound recording associated with the active sound source.

19 Claims, 8 Drawing Sheets

(58) Field of Classification Search
USPC .............................................. 700/94; 381/17
See application file for complete search history.

(56) References Cited

U.S. PATENT DOCUMENTS

| | | | |
|---|---|---|---|
| 2013/0282373 A1* | 10/2013 | Visser ................ | G10L 21/0208 |
| | | | 704/231 |
| 2018/0261239 A1* | 9/2018 | Falk ........................ | G10L 25/90 |
| 2018/0349708 A1* | 12/2018 | van Hoof ......... | G08B 13/19684 |
| 2019/0313187 A1* | 10/2019 | Stoltze ................... | H04R 3/005 |
| 2020/0090702 A1 | 3/2020 | Gewickey et al. | |
| 2023/0115674 A1* | 4/2023 | Nighman ............... | H04R 3/005 |
| | | | 381/58 |

* cited by examiner

3 Stationary
Speakers

1 Stationary Speaker,
1 Moving Speaker

1 Stationary Speaker,
2 Moving Speakers

3 Moving Speakers

MULTI-SENSOR SYSTEMS AND METHODS FOR PROVIDING IMMERSIVE VIRTUAL ENVIRONMENTS

CROSS REFERENCE TO RELATED APPLICATION(S)

This application is a national stage filing of International Patent Application No. PCT/US2022/051474, filed Dec. 1, 2022, which claims the benefit of U.S. Provisional Application No. 63/284,988, filed Dec. 1, 2021, which is incorporated by reference as if disclosed herein in its entirety.

STATEMENT REGARDING FEDERALLY SPONSORED RESEARCH AND DEVELOPMENT

This invention was made with U.S. Government support under Grant Numbers IIS1909229 and IIP1631674 awarded by the National Science Foundation. The United States Government has certain rights in the invention.

BACKGROUND

Single-domain, e.g., audio, video, or radar, sensor platforms can provide characteristics of multiple domains of source behavior, e.g., identifying target type based on radar data, emotional expression from video data, etc. However, analyzing the same characteristics using multiple sensors tailored to different domains produces far more detailed and reliable information. An intuitive example is the human sensorimotor complex. A concept as simple as "boiling water in a kettle" may be perceivable through visual, auditory, or tactile information alone, but seeing the steam tells us the water is hot, and hearing the bubbling of the water tells us roughly how hot, making touching the water to ascertain its temperature redundant. This example highlights the benefits that complementary information from multiple sensor modalities can provide.

Myriad spatial audio devices are currently available at the consumer level that claim to perform some form of isolation or voice activity detection. However, these audio devices are limited to specific use cases and modalities because of limitations in their ability to provide suitable isolation and detection in dynamic environments. For example, Meeting Owl® (Owl® Labs Inc., Boston, MA) is suited specifically for a conference room modality, where the majority of users are stationary, within a few feet of the system. This system is designed to perform within a maximum radius of 18 feet, and is unable to perform in the presence of external speaker systems. In a more sophisticated platform, Microsoft's Build™ meeting room demonstration, the participants all wear head-mounted lavalier microphones, implying the inability of the centrally-mounted system to isolate speech from the background. These examples suggest a trend in the industry at large to avoid low-level sound source discrimination and isolation problems with high-level recognition and contextualization frameworks.

Several methods are currently available for localization and tracking of speech sources using only audio data from an Higher Order Ambisonics microphone array. Higher Order Ambisonics microphone arrays include a plurality of microphones typically equally spaced on a solid sphere, and configured to provide a target directionality. However, since these do not identify distinct sources on their own, the further processing required for sound source identification makes real-time operation untenable without purpose-built hardware. A few techniques have been explored in recent years for simultaneous data acquisition from camera systems and microphones, and using statistical methods. These methods rely on video cameras processing visible light data, making separating sources of interest from the surrounding environment a significant challenge. In addition, these methods are reliant on front-facing camera systems, which make occlusion by individuals and objects an issue, that may be corrected by sensor fusion techniques using the microphone array data. The complexity of these systems hinders further development of higher-level operations by disadvantageously increasing processing time.

SUMMARY

Aspects of the present disclosure are directed to a system for analyzing sound within a target area including a camera array positioned at a first height above a target area, the camera array including a plurality of cameras oriented to identify the presence of one or more sound sources within the target area, a microphone array positioned at a second height above the target area, the microphone array including a plurality of microphones oriented to receive sound produced from within the target area, and a non-transitory computer storage media coupled with a computing device and encoded with one or more computer programs for analyzing sound sources and sound produced within the target area. In some embodiments, the first height and the second height are substantially equivalent. In some embodiments, the microphone array is mounted substantially concentrically within the camera array. In some embodiments, the one or more computer programs include a direction of arrival (DOA) estimation module configured to estimate a sound vector oriented towards the highest received energy level emitted from within the target area by iteratively sampling a sound energy level frame captured by the microphone array. In some embodiments, the one or more computer programs include a sound source identification module configured to identify within the target area captured by the camera array one or more sound source positions including sound source location and a radius around the sound source location. In some embodiments, the one or more computer programs include a sensor fusion module configured to convert the sound vector and the sound source location into a common data representation. In some embodiments, the one or more computer programs include an association module configured to associate a produced sound corresponding to the sound vector with an active sound source having a radius in alignment with the sound vector. In some embodiments, the one or more computer programs include a beamforming module configured to save audio corresponding to the sound vector and discard audio not corresponding to the sound vector to produce a sound recording associated with an active sound source.

In some embodiments, the DOA estimation module is configured to generate a first plurality of beam steering vectors from the microphone array; identify a highest received energy level in a first beam steering vector from the first plurality of beam steering vectors; generate a second plurality of beam steering vectors within a first space surrounding the first beam steering vector; identify a second highest received energy level in a second beam steering vector from the second plurality of beam steering vector; generate a third plurality of beam steering vectors within a second space surrounding the second beam steering vector, the second space being smaller than the first space; identify a third highest received energy level in a third beam steering vector from the third plurality of beam steering vectors; iteratively generate additional pluralities of beam steering vectors with additional reduced-area spaces surrounding the beam steering vector having the highest received energy level and identifying the associated highest received energy levels additional beam steering vectors until the highest received energy level of the beam steering vector estimates the global maximum energy level from within a sound energy level frame; and estimate the sound vector as the beam steering vector associated with the global maximum energy level.

In some embodiments, the DOA estimation module maintains the sound vector associated with the global maximum energy level until another sound vector is estimated or a hold time is exceeded. In some embodiments, the hold time is about 200 ms. In some embodiments, the DOA estimation module estimates a sound vector at a rate between about 40 kHz and about 100 kHz. In some embodiments, the DOA estimation module includes one or more signal gates configured to discard sound vectors outside the interquartile range of estimated sound vectors, discard sound vectors that do not exceed an ambient noise threshold, or combinations thereof. In some embodiments, the one or more signal gates includes an angular distance gate configured to discard sound vectors without a corresponding potential sound source identified by the sound source identification module. In some embodiments, the DOA estimation module rejects sound energy level frames associated with a diffuse sound field.

Aspects of the present disclosure include a method for analyzing sound within a target area. In some embodiments, the method includes estimating a sound vector oriented towards a highest received energy level emitted from within a target area and captured by a microphone array positioned above the target area, the microphone array including a plurality of microphones oriented to receive sound produced from within the target area; identifying one or more sound source positions within the target area and captured by a camera array including a plurality of cameras oriented to identify the presence of one or more sound sources within the target area, the sound source positions including a sound source location and a radius around the sound source location; converting the sound vector and the sound source location into a common data representation; and associating a produced sound corresponding to the sound vector with an active sound source having a radius in alignment with the sound vector. In some embodiments, the method includes producing a sound recording associated with an active sound source by saving audio corresponding to the sound vector and discarding audio not corresponding to the sound vector. In some embodiments, the method includes maintaining the sound vector until another sound vector is estimated or a 200 ms hold time is exceeded. In some embodiments, the hold time is about 200 ms. In some embodiments, the sound vector is estimated at a rate between about 40 kHz and about 100 kHz.

In some embodiments, the method includes discarding a sound vector that is outside the interquartile range of estimated sound vectors; below an ambient noise threshold; without a corresponding sound source position; or combinations thereof. In some embodiments, the method includes rejecting sound energy level frames associated with a diffuse sound field.

In some embodiments, estimating a sound vector includes capturing a sound energy level frame by the microphone array; generating a first plurality of beam steering vectors from the microphone array; identifying a highest received energy level in a first beam steering vector from the first plurality of beam steering vectors; generating a second plurality of beam steering vectors within a first space surrounding the first beam steering vector; identifying a second highest received energy level in a second beam steering vector from the second plurality of beam steering vector; generating a third plurality of beam steering vectors within a second space surrounding the second beam steering vector, the second space being smaller than the first space; identifying a third highest received energy level in a third beam steering vector from the third plurality of beam steering vectors; iteratively generating additional pluralities of beam steering vectors with additional reduced-area spaces surrounding the beam steering vector having the highest received energy level and identifying the associated highest received energy levels additional beam steering vectors until the highest received energy level of the beam steering vector estimates the global maximum energy level from within a sound energy level frame; and estimating the sound vector as the beam steering vector associated with the global maximum energy level.

Aspects of the present disclosure are directed to a method for analyzing sound within a target area. In some embodiments, the method includes estimating a sound vector oriented towards a highest received energy level emitted from within a target area and captured by a microphone array above the target area at a rate between about 40 kHz and about 100 kHz; identifying via a camera array above the target area one or more sound source positions within the target area captured by the camera array, the sound source positions including a sound source location and a radius around the sound source location; converting the sound vector and the sound source location into a common data representation; associating a produced sound corresponding to the sound vector with an active sound source having a radius in alignment with the sound vector; and maintaining the sound vector until another sound vector is estimated or a 200 ms hold time is exceeded. In some embodiments, the method includes producing a sound recording associated with an active sound source by saving audio corresponding to the sound vector and discarding audio not corresponding to the sound vector.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1:
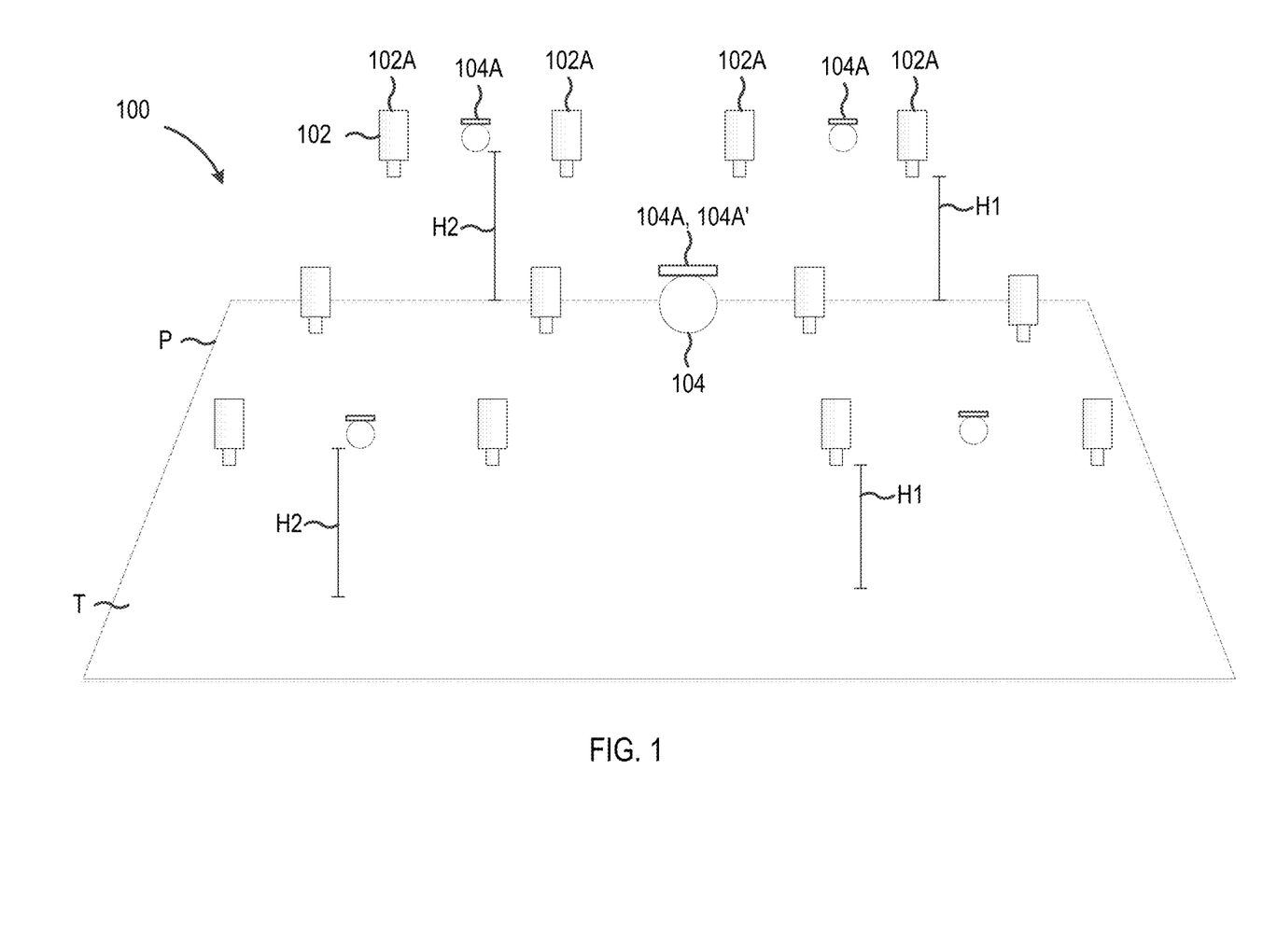
FIG. 1 is a schematic representation of a system for analyzing sound within a target area according to some embodiments of the present disclosure.

Referring now to FIG. 1, some embodiments of the present disclosure are directed to a system 100 for analyzing sound within a target area T. As used herein, "audio" and "sound" may be used interchangeably, and include or correspond to one or more sound signal(s). In some embodiments, target area T is any defined space in which sound sources can be positioned and/or through which sound sources can move. In some embodiments, target area T is a room, hallway, exterior space, etc.

In some embodiments, system 100 includes a camera array 102, also referred to herein as a time-of-flight (TOF) array. In some embodiments, camera array 102 includes a plurality of cameras 102A. In some embodiments, the plurality of cameras 102A are oriented towards target area T to identify the presence of one or more sound sources within the target area. In some embodiments, plurality of camera 102A are each generally oriented towards the center of target area T. In some embodiments, plurality of cameras 102A are each oriented towards a different portion of target area T. In some embodiments, each portion of target area T has at least one of the plurality of cameras 102A oriented to identify the presence of one or more sound sources therein. In some embodiments, plurality of cameras 102A are substantially evenly distributed above target area T. In some embodiments, plurality of cameras 102A are distributed around a perimeter P of target area T. In the exemplary embodiment shown in FIG. 1, plurality of cameras 102A are positioned generally in a grid above target area T, however this embodiment is not intended to be limiting as the plurality of cameras may be arranged in any desired patterns, e.g., a circle, a square, rectangle, triangle, etc.

In some embodiments, cameras 102A are positioned at one or more different heights above target area T. In some embodiments, cameras 102A are positioned at a substantially even height above target area T. As used herein, "substantially even" means the same to within a tolerance. In one nonlimiting example, this tolerance is +/−10%. In some embodiments, camera array 102 is positioned at or above a first height H1 above target area T. In some embodiments, camera array 102 is positioned at about average human head height or above, e.g., above about 5.5 ft. In some embodiments, camera array 102 is positioned above about 6 ft, 8 ft, 10 ft, 12 ft, 14 ft, 16 ft, 18 ft, 20 ft, 25 ft, 30 ft, 35 ft, 40 ft, etc.

In some embodiments, cameras 102A are any suitable camera capable of detecting and/or identifying the physical presence of a sound source in target area T. In some embodiments, cameras 102A are any suitable camera capable of identifying the relative location of a first sound source relative to a second sound source in target area T. In some embodiments, cameras 102A are depth sensing cameras. In some embodiments, camera array 102 is capable of wired or wireless transmission of image/video data to a computing device, e.g., for display, analysis, processing, etc., as will be discussed in greater detail below. In some embodiments, cameras 102A are capable of motion tracking. In exemplary embodiments discussed in greater detail below, cameras 102A are Microsoft Kinect® (Microsoft Corporation, Redmond, WA) units. However, this disclosure is not limited in this regard, and other cameras capable of detecting and/or identifying the physical presence of a sound source in target area T, may be used, within the scope of the present disclosure.

In some embodiments, system 100 includes a microphone array 104, also referred to herein as a Higher Order Ambisonics (HOA) array. In some embodiments, microphone array 104 includes a plurality of microphones 104A. In some embodiments, the plurality of microphones 104A are oriented to receive sound produced from within target area T. In some embodiments, plurality of microphones 104A are each generally oriented towards the center of target area T. In some embodiments, plurality of microphones 104A are each oriented towards a different portion of target area T. In some embodiments, each portion of target area T has at least one of the plurality of microphones 104A oriented to receive sound produced from that portion. In some embodiments, plurality of microphones 104A are substantially evenly distributed above target area T. In some embodiments, plurality of microphones 104A are distributed around a perimeter P of target area T. In some embodiments, a single Higher Order Ambisonics microphone 104A' is positioned substantially at the center of target area T. The Higher Order Ambisonics microphone 104A' may include a plurality of microphones equally spaced on a solid sphere, and configured to provide a target directionality.

In some embodiments, microphones 104A are positioned at one or more different heights above target area T. In some embodiments, microphones 104A are positioned at a substantially even height above target area T. In some embodiments, microphone array 104 is positioned at or above a second height H2 above target area T. In some embodiments, microphone array 104 is positioned at about average human head height or above, e.g., above about 5.5 ft. In some embodiments, microphone array 104 positioned is above about 6 ft, 8 ft, 10 ft, 12 ft, 14 ft, 16 ft, 18 ft, 20 ft, 25 ft, 30 ft, 35 ft, 40 ft, etc. In some embodiments, microphone array 104 is positioned coplanar with camera array 102. In some embodiments, the sensors in microphone array 104 are the same height above target area T as the sensors in camera array 102, i.e., H1 is equivalent to H2.

Figure 2:
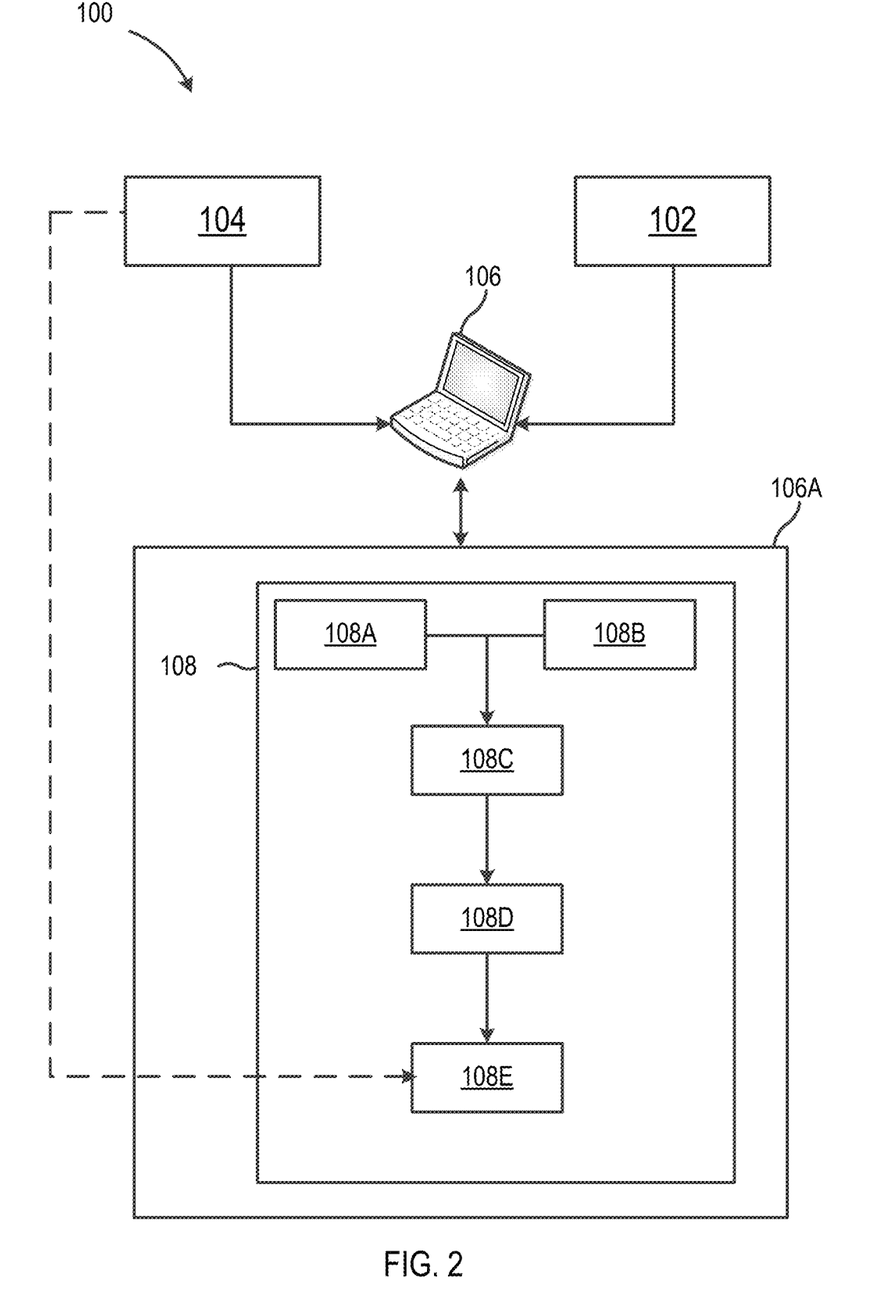
FIG. 2 is a schematic representation of a system for analyzing sound within a target area according to some embodiments of the present disclosure.

Referring now to FIG. 2, in some embodiments, system 100 includes a computing device 106. In some embodiments, camera array 102 and microphone array 104 are integrated with computing device 106. In some embodiments, camera array 102 and microphone array 104 are coupled with computing device 106. In some embodiments, camera array 102 and microphone array 104 are coupled with computing device 106 via a wired connection, wireless connection, or combinations thereof.

In some embodiments, computing device 106 includes any suitable hardware to receive, store, analyze, process, transmit, etc. data from camera array 102 and microphone array 104. Some embodiments of computing device 106 include one or more processors. The processor may include, for example, a processing unit and/or programmable circuitry. The processing units or circuits can include hardwired circuitry, e.g., programmable logic devices, programmable array logic, field programmable gate arrays, etc., programmable circuitry, e.g., computer processors including one or more individual instruction processing cores, microcontrollers, etc., state machine circuitry, and/or firmware that stores instructions executed by programmable circuitry.

Some embodiments of computing device 106 include a machine readable storage device including any type of tangible, non-transitory storage device, e.g., compact disk read-only memories (CD-ROMs), semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, etc.

In some embodiments, computing device 106 includes a non-transitory computer storage media 106A coupled therewith. In some embodiments, non-transitory computer storage media 106A is encoded with one or more computer programs 108 for analyzing sound sources and sound produced within target area T.

In some embodiments, one or more computer programs 108 include a direction of arrival (DOA) estimation module 108A. In some embodiments, DOA estimation module 108A is configured to estimate a sound vector oriented towards the highest received energy level emitted from within target area T. Thus, in some embodiments, DOA estimation module 108A is tasked with estimating the positioning of an active sound source with respect to microphone array 104. As will be discussed in greater detail below, the orientation of the sound vector is then colocated with sound sources identified by camera array 102 in target area T, enabling accurate identification of an active sound source in target area T and the ability to isolate and record sound from those active sources.

In some embodiments, DOA estimation module 108A estimates the sound vector by iteratively sampling sound energy level frames captured by microphone array 104. In some embodiments, DOA estimation module 108A utilizes a sparse iterative search (SIS) algorithm to analyze the sound energy level frames and estimate the sound vector. In some embodiments, DOA estimation module 108A generates a plurality of beam steering vectors corresponding to the environment within the microphone array. The beam steering vector corresponding to the maximum power identified by those steering vectors is selected, and a random sample of new beam steering vectors are generated from within space surrounding the previous maximum steering vector. SIS iterates until the beam steering vectors converge on the global max of energy distribution for a given frame, defined as the direction of arrival or sound source.

In an exemplary embodiment, DOA estimation module 108A generates a first plurality of beam steering vectors from the microphone array. The DOA estimation module 108A then identifies a highest received energy level in a first beam steering vector from the first plurality of beam steering vectors. The DOA estimation module 108A then generates a second plurality of beam steering vectors within a first space surrounding the first beam steering vector and identifies a second highest received energy level in a second beam steering vector from the second plurality of beam steering vector and so on. The DOA estimation module 108A iteratively generates additional pluralities of beam steering vectors with additional reduced-area spaces surrounding the beam steering vector having the highest received energy level and identifying the associated highest received energy levels additional beam steering vectors until the highest received energy level of the beam steering vector estimates the global maximum energy level from within a sound energy level frame. The sound vector is then estimated as the beam steering vector associated with the global maximum energy level of the frame.

In some embodiments, the sound vector estimated by DOA estimation module 108A is provided in polar coordinates. In some embodiments, the sound vector has a unit radial length oriented towards a sound source, e.g., an active sound source. In some embodiments, DOA estimation module 108A estimates the sound vector at a desired audio sampling rate. In some embodiments, DOA estimation module 108A estimates the sound vector at a rate between about 40 kHz and about 100 kHz. In some embodiments, DOA estimation module 108A estimates the sound vector at the audio sampling rate, e.g., about 48 KHz.

In some embodiments, DOA estimation module 108A is configured to reduce the influence of noise, reverberations, etc. when identifying the beam steering vector associated with the global maximum energy level of the sound energy level frame. In some embodiments, DOA estimation module 108A maintains the sound vector associated with the global maximum energy level until another sound vector is estimated or a hold time is exceeded. Speech is a highly variable phenomenon in both time and frequency. Maintaining temporal saliency during active speech is beneficial for automatic identification of speech activity. Since the frame rate of the audio processing system is significantly faster than per-syllable utterances by a speaker, audio frames which occur mid-sentence, or mid-syllable can be erroneously identified as inactive. In some embodiments, the time sample-and-hold operation is performed, which maintains the last-known accurate estimate until either a new estimate is produced, the hold time is exceeded, or combinations thereof. In some embodiments, the hold time is less than about 400 ms, 300 ms, 200 ms, or 100 ms. In some embodiments, the hold time is about 200 ms.

In some embodiments, DOA estimation module 108A includes one or more signal gates. In some embodiments, DOA estimation module 108A includes binary masking. In some embodiments, DOA estimation module 108A includes one or more signal gates to reject outlier sound vectors. Strong specular reflections and other ambient noises from target area T may be incident upon microphone array 104, which can contribute to outliers in measurement. In some embodiments, a moving time average is used to discard sound vector estimates which fall outside of the interquartile range of the mean estimation error for the frames sampled from target area T. In some embodiments, the moving time average is less than about 400 ms, 300 ms, 200 ms, 100 ms, or 50 ms.

In some embodiments, DOA estimation module 108A includes one or more signal gates to discard sound vectors that do not exceed an ambient noise threshold. In some embodiments, the signal gates of DOA estimation module 108A evaluate energy in the zeroth-order omnidirectional harmonic component of the signal from microphone array 104 and rejects sound energy level frames which do not exceed an ambient noise threshold.

In some embodiments, to increase the reliability of the system for practical implementation, several additional features are added to DOA estimation module 108A. In some embodiments, these features allow localization estimates to correspond to binary masking associated with accurate speech and reduce the prevalence of inaccurate estimates due to noise or reverberation. Each of these operations enable accurate speech identification and localization under, e.g., reverberation, and, in aggregate, enable consistent performance as part of a multi-sensor platform.

In some embodiments, DOA estimation module 108A includes one or more signal gates to reject sound energy level frames associated with a diffuse sound field. In some embodiments, an approximation of the diffuse field is taken by measuring the range and variance in energy estimates from each beam steering vector during SIS, e.g., during an initialization stage thereof, where beams are distributed evenly over the surface of a sphere corresponding to target area T. In some embodiments, sound energy level frames which exhibit the wide variance and minimal range indicative of a diffuse field are rejected.

In some embodiments, one or more computer programs 108 include a sound source identification module 108B. In some embodiments, sound source identification module 108B is configured to identify the position of one or more sound sources in target area T, e.g., via camera array 102. In some embodiments, source positions include the physical location for the sound source, a radius around the sound source location, or combinations thereof. In some embodiments, sound source identification module 108B subtracts background features identified in the camera array. In some embodiments, the cameras utilize background subtraction and a Gaussian mixture model to identify individuals in the target area. In some embodiments, cartesian coordinates are assigned to each potential sound source, e.g., person, using a unified grid corresponding to the floor space of the room.

Referring again to DOA estimation module 108A, in some embodiments this module includes one or more signal gates to discard sound vectors without a corresponding potential sound source identified by the sound source identification module, e.g., an angular distance gate. These gates aid in reducing the effect of noise incident on microphone array 104 by eliminating vectors unlikely to be affiliated with an active sound source in target area T.

In some embodiments, one or more computer programs 108 include a sensor fusion module 108C. In some embodiments, sensor fusion module 108C is configured to convert the sound vector and the sound source location into a common data representation, e.g., cartesian coordinates, polar coordinates, etc. In exemplary embodiments, when the zero point of the coordinate plane of camera array 102 is colocated with microphone array 104, an arctangent function and Euclidian distance calculation can be used to convert cartesian coordinates, e.g., for the individuals identified by cameras 102A, into azimuth and range values, e.g., for the sound vector estimated by DOA estimation module 108A. The haversine formula (Equation 1 below) can be used to associate the data from the camera and microphone arrays by producing absolute distances in radians:

$$d = 2*\arcsin\left(\sqrt{\sin(\theta_1-\theta_2)^2 + \cos(\theta_1)\cos(\theta_2)\sin\left(\frac{|\phi_1-\phi_2|}{2}\right)^2}\right) \quad \text{(Equation 1)}$$

As discussed above, the temporal variability of conversational speech during continuous segments produces dropped sound energy level frames and misidentification, even with the features incorporated by system 100. In some embodiments, in order to account for the behavior of speakers switching in conversation and reduce identification errors during continuous speech, an exponential probability distribution according to Equation 2 below is used:

$$p(s_i(\delta(t))|\lambda) = \lambda e^{-\lambda\delta(t)}H(\delta(t)) \quad \text{(Equation 2)}$$

where $s_i(\delta)(t)$ is the last active speaker recorded at time t, and $H(\delta(t))$ is the Heaviside step function. This aids in speaker identification by characterizing speaker switching as the probability of a given speaker continuing a conversation after a given interval of time has elapsed.

In some embodiments, one or more computer programs 108 include an association module 108D. In some embodiments, association module 108D is configured to associate a produced sound corresponding to the sound vector with an active sound source having a radius in alignment with the sound vector. In one embodiment, association module 108D generates a data set of speech sources with active speech activity. When a sound vector from an acoustic detection falls within a radius G of a single sound source, e.g., person, identified by sound source identification module 108B, that detection may be immediately associated with the person. If not, the sound vector may be discarded. In some embodiments, if the sound vector falls within a gating region including more than one person, assumptions about source activity, ground truth provided by camera array 102, error distribution of microphone array 104, etc. allow for a spatial proximity detection method, i.e., Nearest Neighbor.

In some embodiments, one or more computer programs 108 include a beamforming module 108E. In some embodiments, beamforming module 108E is configured to save audio corresponding to the sound vector and discard audio not corresponding to the sound vector to produce a sound recording associated with an active sound source, e.g., isolated from a single speaker amongst a plurality of possible speakers. In some embodiments, the beamforming module includes a minimum-variance distortionless response (MVDR) beamformer with a Wiener post-filter. Output from beamforming module 108E is summed together to produce audio output, but during inactive segments, the output is not associated with any individual sound source. Upon detected speech activity from an individual, data from beams steered to inactive targets is discarded, and voice activity is recorded and associated with the active individual.

Figure 3A:
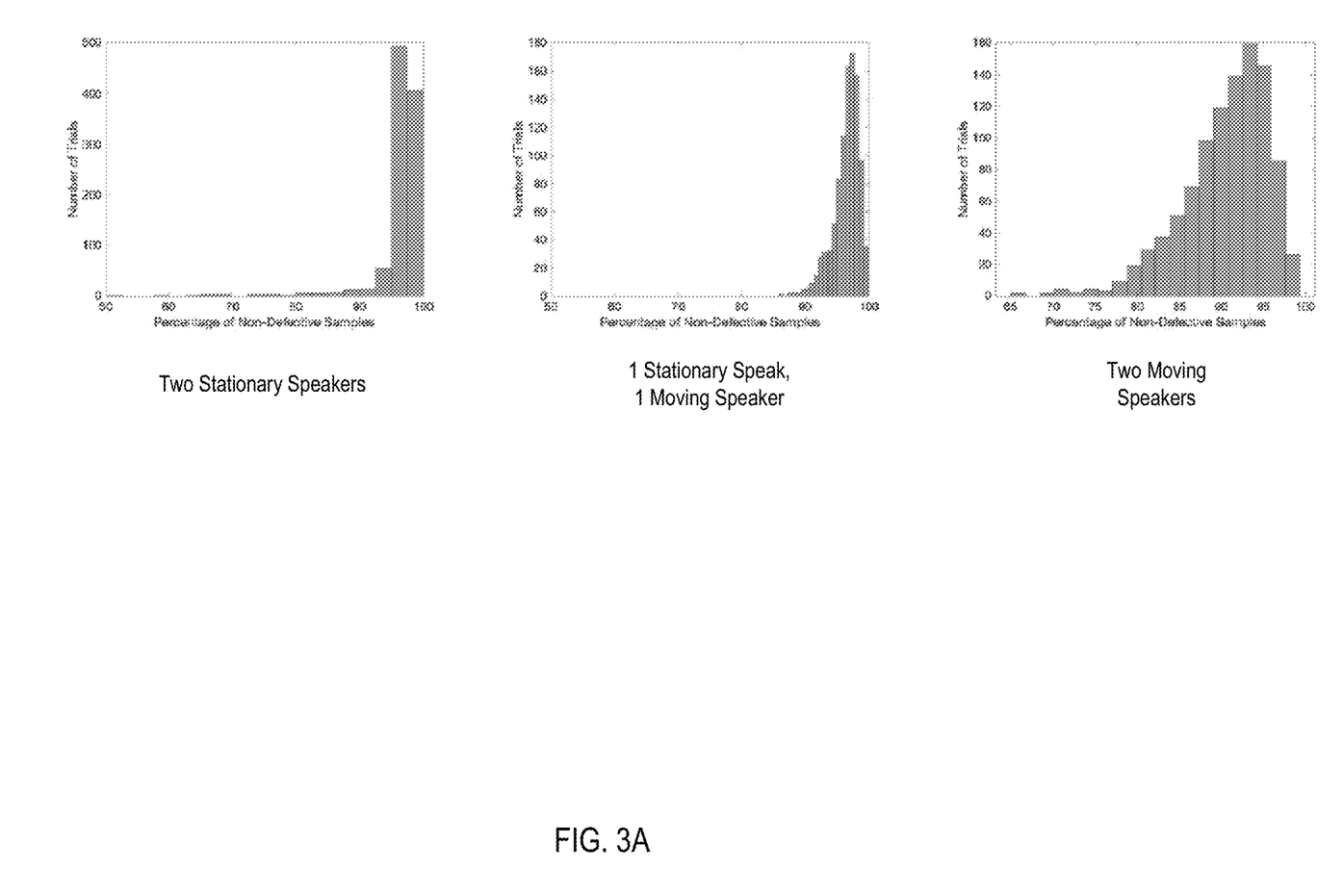
FIG. 3A is a graph showing the distribution of correctly identified active sound sources by a model simulating the systems for analyzing sound within a target area according to some embodiments of the present disclosure.
Figure 3B:
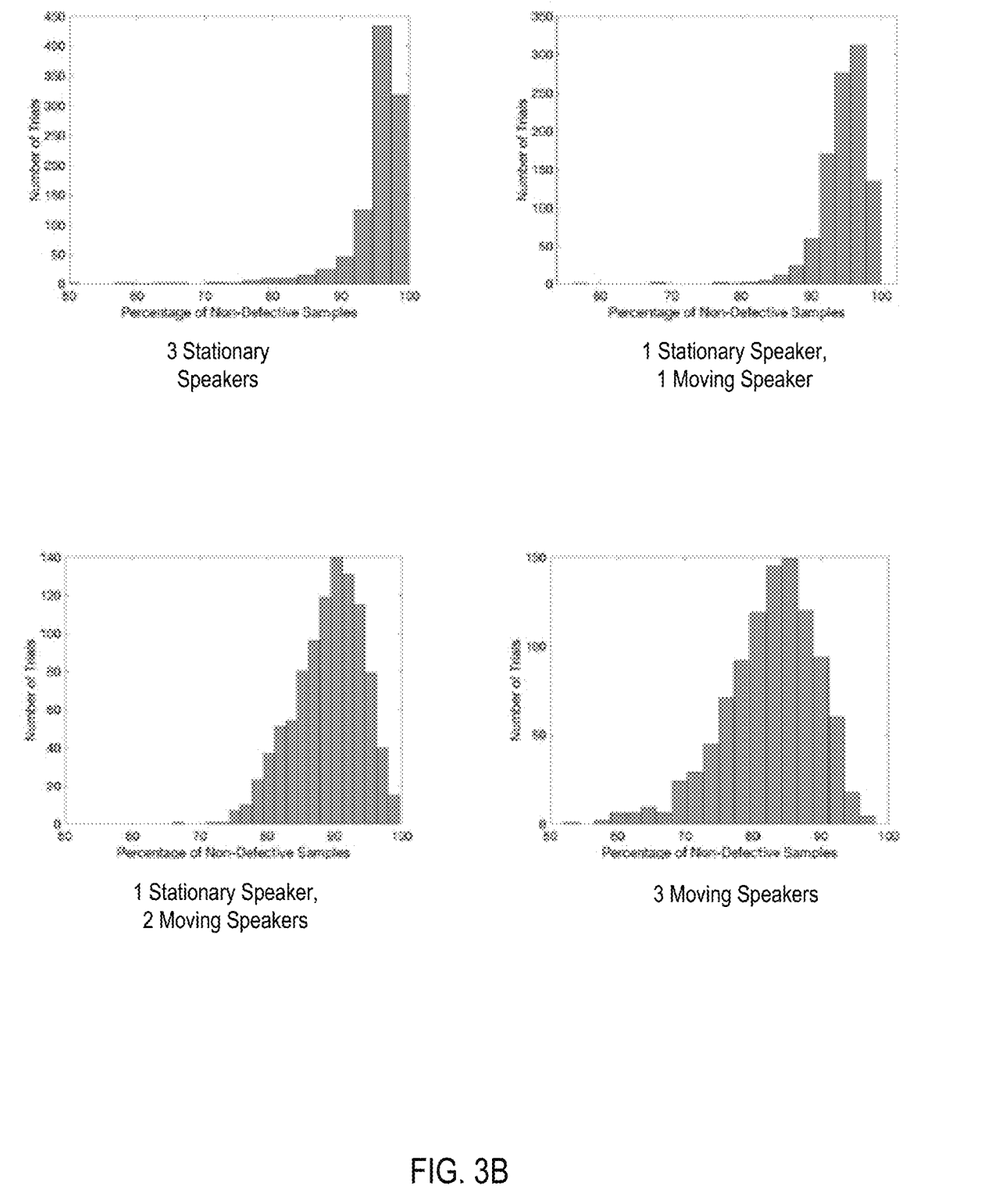
FIG. 3B is a graph showing the distribution of correctly identified active sound sources by a model simulating the systems for analyzing sound within a target area according to some embodiments of the present disclosure.

Referring now to FIGS. 3A and 3B, a model of system 100 was developed in MATLAB to verify the performance of the system by stochastically simulating the behavior of two human sound sources and their associated voice activity in a target area. Camera array 102 recorded the position of individuals on a space having grid of 1280×960 pixels. The height of camera array 102 was measured to be 3.31 m from the floor of the space. To simulate the height of the microphone array relative to the floor in the simulation, the ratio of the diagonal length from the center of the pixel grid to pixel "height" was fit to a reference target area according to Equation 3 below:

$$h_{sim} = \frac{h_{craive}}{\sqrt{l_{craive}^2 + w_{craive}^2}}\sqrt{l_{sim}^2 + w_{sim}^2}. \quad \text{(Equation 3)}$$

which computed to approximately 700 pixels. For each trial, 1000 samples were generated to correspond to about 40 seconds of activity, assuming system 100 generated a sound energy level frame of data at a constant rate of 25 frames per second. For each sound source, a set of points was randomly selected on the floor grid, and cubic interpolation was used to generate continuous travel paths. Stationary speaker positions were simulated by randomly generating constant x-y coordinates.

To produce speech from each source, a uniform random number generator produced binary outputs for each sound energy level frames, rather than continuous segments. This was done to simulate dropped sound energy level frames due to syllabic gaps or momentary pauses in speech. Speech segments were created by first generating several "switching points" to denote speaker change. An overlap parameter governed the degree to which speech would occur simultaneously from multiple speakers to model speaker interruption. Finally, simulated speech activity for superimposed paths were nullified under the assumption that human speakers generally do not superimpose under typical circumstances. The distance for the superposition criteria was set at 5 pixels, corresponding to a real-world area of approximately 6.5 cm², which still considers individuals for whom personal space is not an issue.

To simulate sound vector estimation from microphone array 104, a virtual HOA microphone array was positioned at the center of the grid, at the height specified. The HOA microphone array response included the generated binary maps of voice activity data and an error term to simulate noisy data. The grid coordinates for each sound energy level frame were converted into azimuth and elevation, given the array height. Localization error data was used. A randomly selected error value from trials using a reverberation time of 0.9 s (which corresponds to broadband RT of 0.89 s) was added to the coordinates of each sound energy level frame of simulated speech data. Data from camera array 102 was similarly transformed into polar coordinates using the generated path coordinates. An error term was also added to this data to simulate noise in the location estimates, corresponding to an area of 9 cm² centered at each speaker position.

To test accuracy of system 100, the model was evaluated with either two or three active speakers. 1000 trials were run for each case. The data association process was implemented as described above. The localized voice activity data produced by the simulated system was compared to the ground truth voice activity from each speaker and the associated path. Defective frames included those which misidentified the active speaker, or did not accurately localize. Accuracy of system 100 was expressed as a percentage of correctly associated frames to total frames of active speech data. On average, for two sources, the percentage of correctly identified samples was 95.6%. For three sources, the average was 89%. FIG. 3A shows the distribution of trials in terms of the percentage of correctly identified samples for two sources, for two stationary speakers, a single moving speaker, or two moving speakers. FIG. 3B shows similar data for three active speakers, all stationary, one moving, two moving, and three moving. Even in cases with all sources moving, for both two- and three-speaker scenarios, over 70% of samples return an accurate identification in the vast majority of trials.

Figure 4:
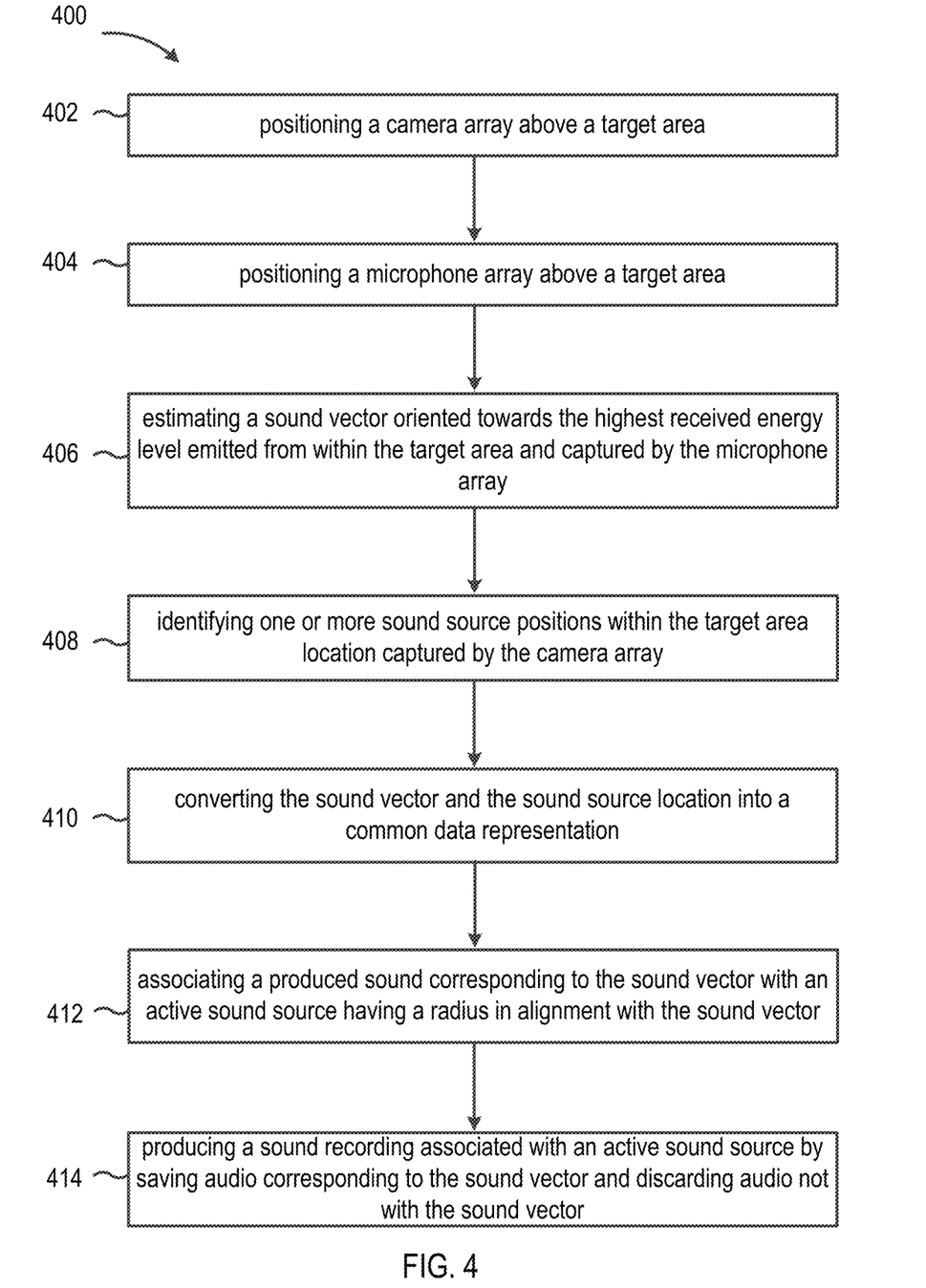
FIG. 4 is a chart of a method for analyzing sound within a target area according to some embodiments of the present disclosure.

Referring now to FIG. 4, some embodiments of the present disclosure are directed to method 400 for analyzing sound within a target area, e.g., target area T described above. At 402, a camera array is positioned above a target area. As discussed above, in some embodiments, the camera array includes a plurality of cameras oriented to identify the presence of one or more sound sources within the target area. At 404, a microphone array is positioned above the target area. As discussed above, in some embodiments, the microphone array includes a plurality of microphones oriented to receive sound produced from within the target area.

In some embodiments, at 406, a sound vector oriented towards the highest received energy level emitted from within the target area is estimated and captured by the microphone array. At 408, one or more sound source positions within the target area captured by the camera array are identified. As discussed above, in some embodiments, the sound source positions include a sound source location and a radius around the sound source location. At 410, the sound vector and the sound source location are converted into a common data representation. At 412, a produced sound corresponding to the sound vector is associated with an active sound source having a radius in alignment with the sound vector. In some embodiments, at 414, a sound recording associated with an active sound source is produced by saving audio corresponding to the sound vector and discarding audio not with the sound vector.

Figure 5:
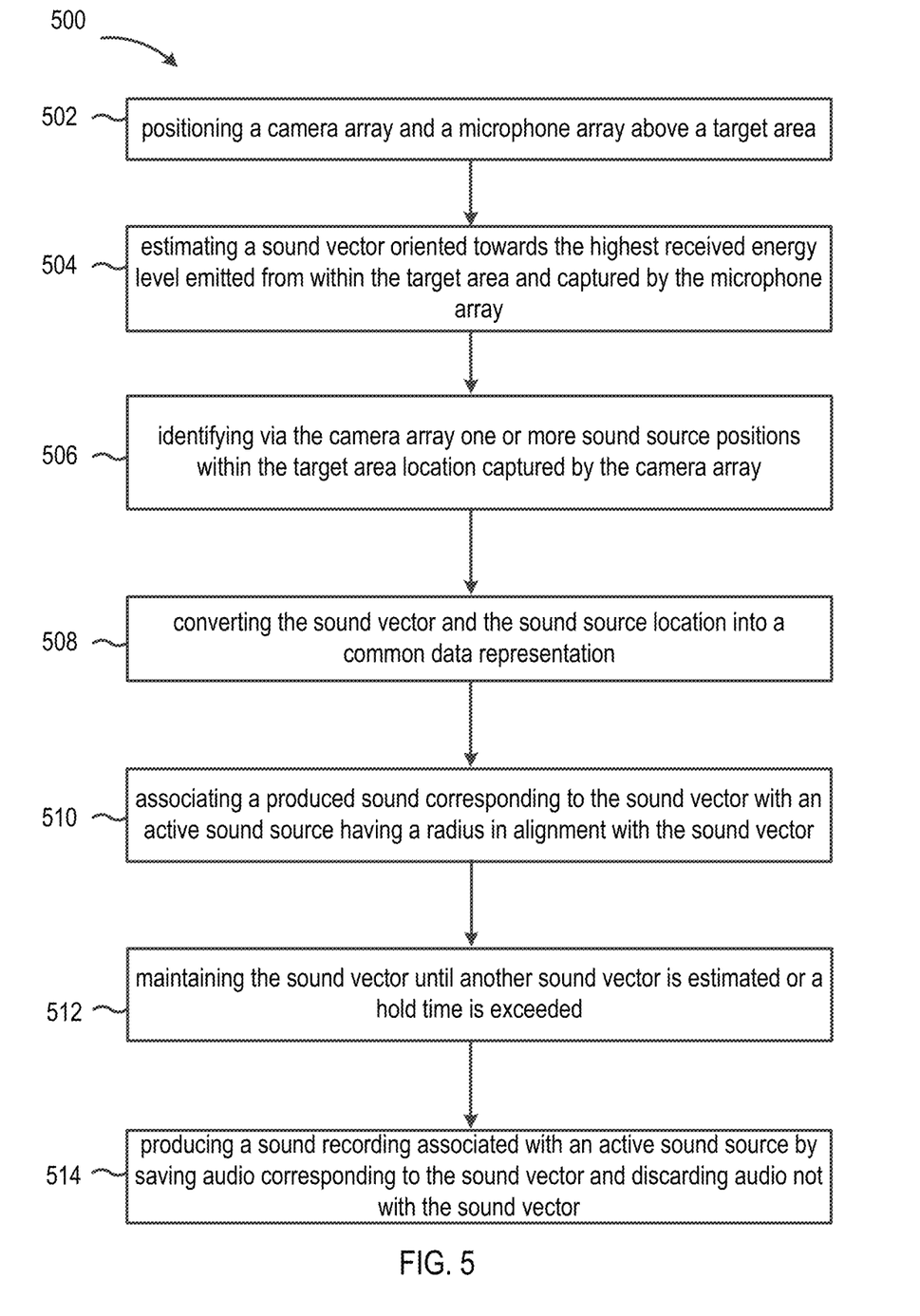
FIG. 5 is a chart of a method for analyzing sound within a target area according to some embodiments of the present disclosure.

Referring now to FIG. 5, some embodiments of the present disclosure are directed to a method 500 for analyzing sound within a target area. At 502, a camera array and a microphone array are positioned above a target area. As discussed above, in some embodiments, the microphone array is positioned substantially coplanar with and concentrically within the camera array. At 504, a sound vector oriented towards the highest received energy level emitted from within the target area and captured by the microphone array is estimated at a rate between about 40 kHz and about 100 kHz. At 506, the camera array identifies one or more sound source positions within the target area captured by the camera array, the sound source positions including a sound source location and a radius around the sound source location. At 508, the sound vector and the sound source location are converted into a common data representation. At 510, a produced sound corresponding to the sound vector is associated with an active sound source having a radius in alignment with the sound vector. At 512, the sound vector is maintained until another sound vector is estimated, a hold time is exceeded, or combinations thereof. As discussed above, the temporal variability of conversational speech during continuous segments produces dropped sound energy level frames and misidentification. The time sample-and-hold operation of step 512 maintains the last-known accurate estimate until either a new estimate is produced, the hold time is exceeded, or combinations thereof. In some embodiments, as discussed above, that hold time is 200 ms. At 514, a sound recording associated with an active sound source is produced by saving audio corresponding to the sound vector and discarding audio not with the sound vector.

Example

In this exemplary embodiment, several assumptions were made about the behavior of individual sound sources in the target area. First, people cannot be colocated at the same point in the target area. Second, in typical conversations, only a single speaker is active at a time, except in brief moments of confusion during speaker switching due to interruption. Finally, typical interactions between individuals in the target area occur within a social-personal zone of approximately 1.3 meters or more. These assumptions allow us to identify speakers via spatial proximity.

The system of the exemplary embodiment included a camera array including 3×2 grid of Microsoft Kinect® 2 (Microsoft Corporation, Redmond, WA) depth sensing cameras mounted in the ceiling of a room at a distance of approximately 5 m from the floor thereof, with three cameras along the long axis of the room, and two along the short axis of the room. This grid acted as the camera array shown in FIGS. 1 and 2 above. These cameras were connected to a personal computer running software based on the Kinect API which produces tracked coordinates for each individual sound source in the room.

An HOA microphone array was installed at a height of 3.3 m above the floor in the center of the room. A Dante audio networking protocol was utilized to integrate the array into the personal computer.

The DOA estimation module was developed as real-time software using Max 8. The module was written in C++ using the Max API and integrated into the Max patching environment as an external object. The output of the DOA estimation module was sampled at a rate of 50 frames per second to facilitate network transmission. The additional features of the DOA estimation module as described above were incorporated either as C++ code, e.g., diffuse and outlier rejection, etc., or as Max routines, e.g., gating, sample and hold, etc.

In the exemplary embodiments, the Cartesian grid of the target area was 1280×960 units in size, with each unit corresponding to an area of approximately 25 mm$^2$. In practice, the recorded position of a stationary person in the target area may change by as much as 6 pixels in any direction.

Figure 6:
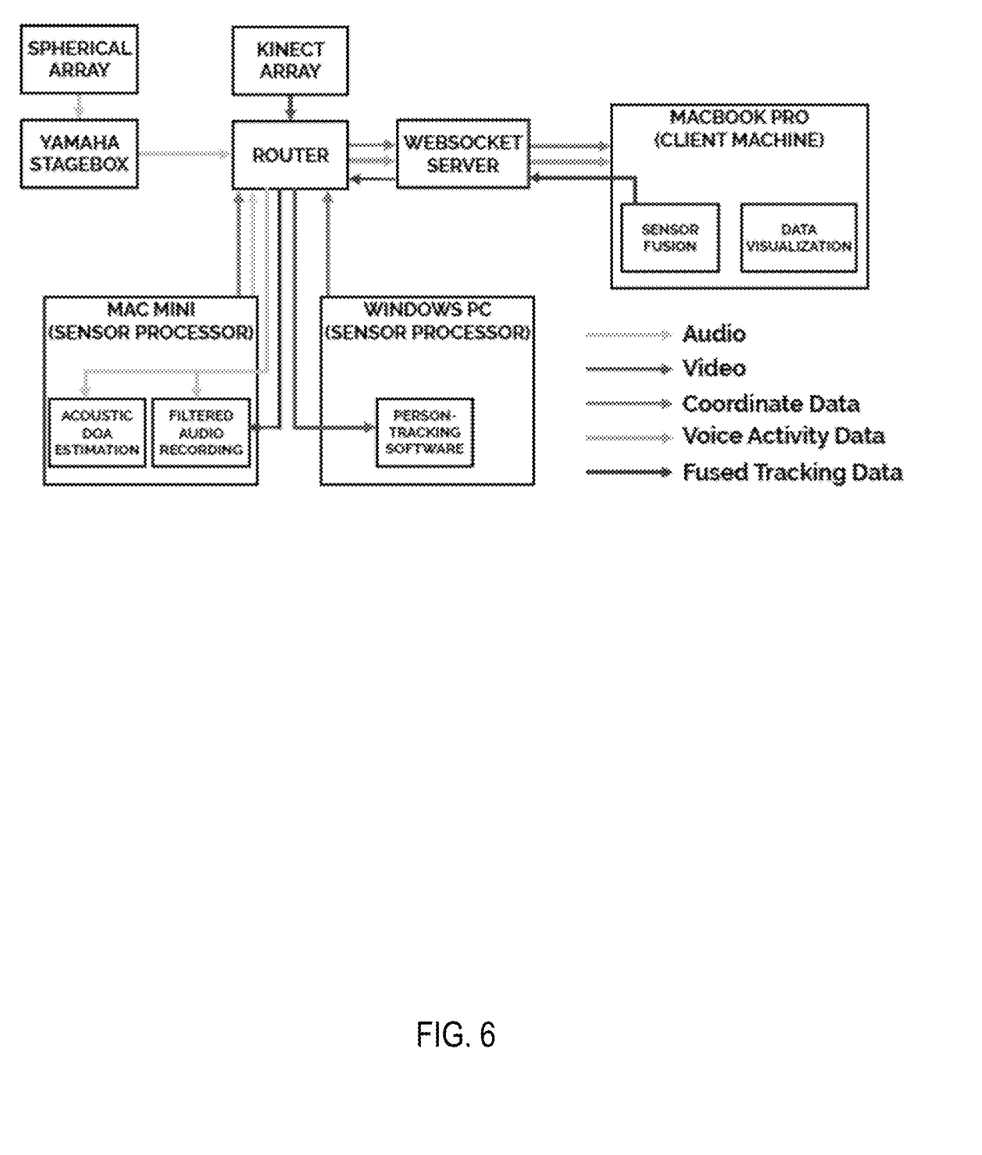
FIG. 6 is a schematic representation of a system for analyzing sound within a target area according to some embodiments of the present disclosure.

Referring now to FIG. 6, a client-server framework based on JavaScript was used to integrate the camera array and the HOA microphone array. The camera array processing software used the WebSockets protocol to send data packages containing tracking data to a remote Amazon Web Services (AWS) server. These packages were formatted in JavaScript Object Notation (JSON), which contains keyvalue pairs. In this exemplary embodiment, the camera array ran on a Windows PC dedicated to processing that array, e.g., processing the sound source identification module.

The Max patch ran the HOA microphone array processing, and also included an internal interpreter for JavaScript. A sensor input/output (IO) module was developed in JavaScript to connect to the local server using the SocketIO protocol, which incorporates several additional features alongside the WebSockets protocol for easy implementation and expansion. The JavaScript module of the HOA microphone array also included an input structure which allowed data received from networked systems to modify sensor processing parameters. In the exemplary embodiment, the HOA microphone array can receive data from the network to change the orientation of a steered beamformer to localize on an active source. The HOA microphone array typically runs on a Mac Mini. However, since audio is available on the local network via Dante, any machine capable of running Max and Dante may perform HOA microphone array processing, e.g., processing the DOA estimation module, and sensor networking.

The server ran on a Mac Pro assigned with a static IP address. Using both the SocketIO and WebSockets protocols, it received incoming JSON data, and output a single JSON package containing sensor information from all arrays on the network. In some embodiments, client machines may connect to this network to receive streams of combined sensor data. Issues with temporal synchronicity and latency were solved by using WebSockets and SocketIO. Because these protocols were asynchronous, JSON packages were output from the arrays at the rate they were received. Without wishing to be bound by theory, since each sensor array outputs data at a different rate, the rate of output from the server is governed by the fastest sensor on the network. Data from slower sensors was held constant on the server until updated. This ensured that any package sent from the server incorporated the most up-to-date information from all sensors simultaneously.

Figure 7:
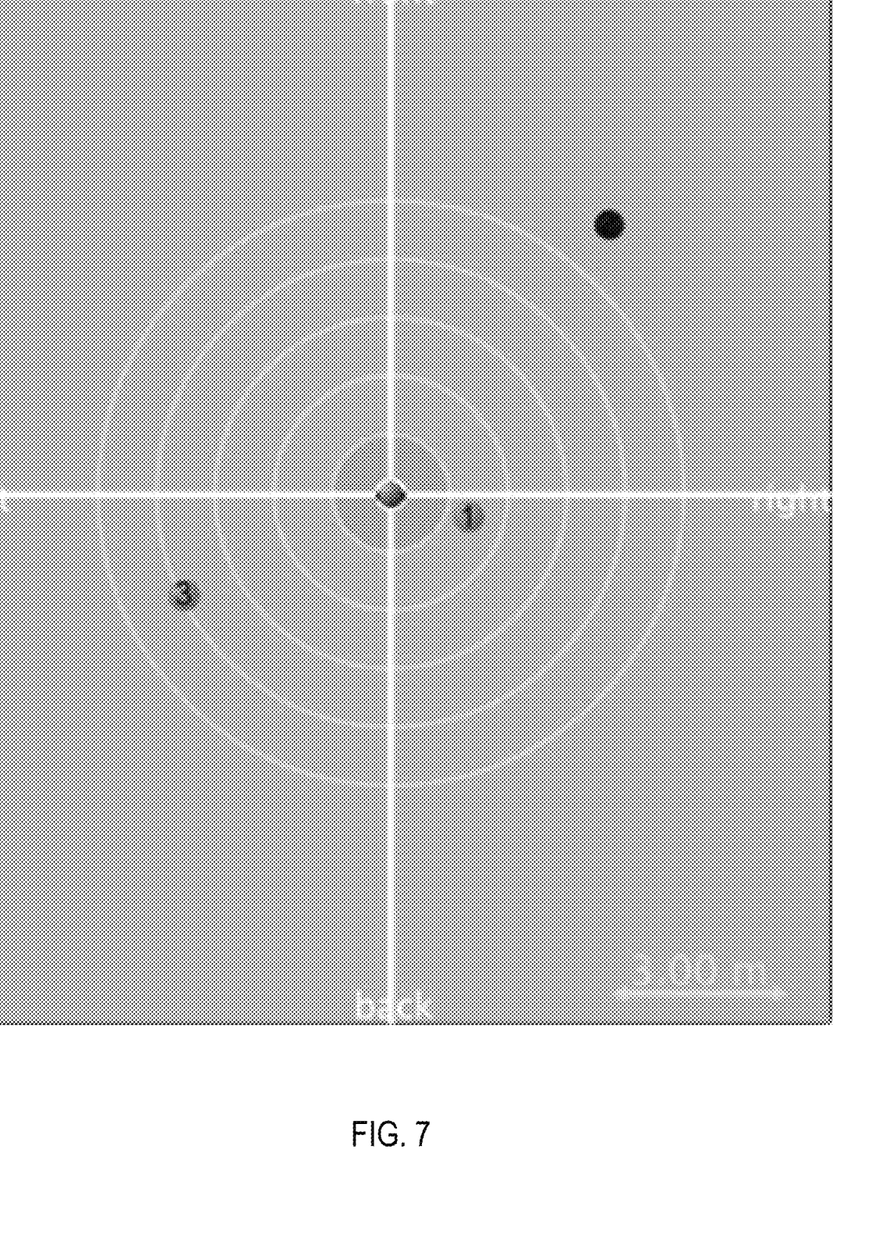
FIG. 7 is a graphical representation of sound sources identified in a target area by systems according to some embodiments of the present disclosure.

Referring now to FIG. 7, and as discussed above, a mapping operation, e.g., a sensor fusion module, was used to convert data from one format to the other, allowing for common data representation of two-dimensional spherical information from the HOA microphone array and the effectively two-dimensional rectangular plane from the camera array. Sensor fusion was performed client-side to maximize network flexibility. Client scripts to access the sensor network were written in JavaScript, which allowed any machine on the network to access data from the system, including camera and microphone arrays themselves. The fusion methodology was implemented in JavaScript within a Max patch. To visualize the fused data output, the JSON data containing complete records of data from all sensor platforms was parsed and processed, then output as Open Sound Control (OSC) messages to an Spat5 visualizer developed by IRCAM for Max. This visualizer displayed each person in the space as a green circle, with each circle turning blue when voice activity is detected and associated with a given source.

Without wishing to be bound by theory, since ground truth for the position of each person in the target area is produced by the camera array, verification of system operation is dependent on accurate data association and system latency. At the client node of the system, console output was generated at regular 10 ms intervals, or when an update was received from the server. Each line of output was logged with a timestamp relative to the client system's internal clock to produce accurate timing records. The number of sources and coordinates for each source in polar coordinates were recorded from the camera array, as well as the polar coordinates generated by the HOA microphone array and the DOA estimation module. The camera array and sound source identification module generated numeric values for each person present. This value was used to identify the active speaker. Ground truth for voice activity was recorded using two lapel microphones connected to the client machine. This HOA microphone array data was converted into binary maps associated with each speaker.

For a single speaker, three trials were run to produce a total 2646 samples of tracking data with associated ground truth audio, with each trial lasting approximately 10 seconds. Active speech was detected and localized 94.9% of the time relative to the ground truth. Error was primarily associated with latency between the lavalier recording equipment and the multi-sensor platform, since erroneous detections only occurred within approximately 150 ms of speech onset or cessation. For multiple speakers, a total of 24 trials were run for cases with two and three speakers. For two speakers, three conditions were tested-both speakers stationary, one speaker moving, and both speakers moving. For three speakers, corresponding conditions were tested. Each trial lasted approximately 15 seconds. The average number of samples collected per trial was 1040 for the two-speaker cases, and 1530 for the three-speaker cases. For each test case, the active speaker was identified on a frame by-frame basis. Sound energy level frames where the actively speaking individual was correctly identified by the platform were recorded relative to the total number of active frames indicated by ground truth data. These values were used to reject cases of misidentification during active speech, missed detections, and false alarms. The corresponding accuracy values for each test condition are recorded in Table 1 below. These values are slightly lower than those recorded in the simulation data. As in the single speaker case, the majority of the erroneous values may be attributed to latency between the ground truth and sensor platform data streams, since approximately 10-20 frames (corresponding to approximately 200 ms) were misidentified on speech onset or cessation due to temporal smoothing operations either in the ground truth data collection system or the sensor platform.

TABLE 1

Results from trials using the exemplary system with two or three speakers present. The values displayed are the percentage of frames detected by the platform which accurately identified the active speaker, relative to the ground truth activity data for each speaker.

| Two Speakers -- % Correct Frames | |
| --- | --- |
| Stationary | 87.8 |
| One Moving | 86.1 |
| Both Moving | 81.7 |
| Three Speakers -- % Correct Frames | |
| Stationary | 84.2 |
| One Moving | 83.7 |
| Two Moving | 80.3 |
| All Moving | 84.9 |

A steerable beamformer was developed and integrated into the sensor platform. The MVDR beamformer with Wiener post-filtering was implemented as a Max external object and run in parallel with the DOA estimation module. Average latency produced by the system due to speech onset is approximately 150 ms, which translates directly into the delay in producing a steering vector towards the active speaker. Overall, the latency between sound input and audio output was approximately 0.5 seconds, suitable, e.g., for conferencing applications.

Latency of each sensor subsystem was measured by calculating the average time between sensor updates using the timing data from the console output of the real-time trials. Average latency for the camera array was 118.8 ms, corresponding to 8.4 frames of data per second. Average latency for the microphone array was 28.6 ms, or 34.9 frames per second. These values are in keeping with the typical operating rates of each module, though the DOA estimation module is slightly slower than expected due to the additional operations that ensure tracking consistency (gating, sample and hold, etc.). These results indicate that networked operation does not incur additional latency penalties, and that each array asynchronously forces a data update across the network so that the most recent data package received by each client contains the newest information from all sensors simultaneously.

The evaluation of multi-sensor paradigms for immersive environments is a nascent field. Extracting information about occupants in an immersive space may provide valuable sensory feedback, and can indicate a difference between a room filled with display technology, and an intelligent, coherent, computing system. Correlating audio and speech activity with positional information is a useful task for a space, i.e., environment to perform. In one nonlimiting example, information can be encapsulated via object-based encoding schemes for audio to efficiently convey a spatial sound field. The utility of a room equipped as such may extend to even remote users, who can take advantage of broadcasted sensor data to produce a spatially-informed experience.

Methods and systems of the present disclosure are advantageous to provide a reliable method for tracking multiple users in a space with simultaneous contextual awareness of both location and voice activity with minimal opportunity for confusion. Higher-order Ambisonic microphone arrays running sparse iterative search algorithms and depth sensing camera arrays enable source-specific voice activity detection. The acoustic direction of arrival estimates produced are post-processed to generate low-latency localization of speech activity, and are fused with the coordinate data of each speaker in a space via coordinate remapping, spatial gating, and temporal smoothing. This results in a real-time overhead view of each speaker in the room, and identification of the accurate speaker. Location estimates from the fused data can be used to generate localized speaker activity maps for multiple users in a room. Through the use of adaptive acoustic beamformers, beamforming methods, array processing hardware, and array design, activity maps may then be used to reproduce isolated audio from each user without the need for body-worn devices. For larger spaces with active noise sources and significant reverberation, adaptive beamforming techniques can be used to suppress clutter and produce a clear recording of the active speaker The network infrastructure provides room for expansion, allowing for such features as speaker-localized audio recording using the microphone array data. Positioned above the target area, the camera and microphone arrays provide an unobtrusive system which is resilient to real-world conditions that is both extensible and generalizable to a wide set of applications without additional equipment. Applications of this system include audio monitoring for user-specific system input, telematic transmission of speech and position data for immersive teleconferencing, and higher-level processing, such as user-specific behavior monitoring through voice, body position, and movement.

Although the invention has been described and illustrated with respect to exemplary embodiments thereof, it should be understood by those skilled in the art that the foregoing and various other changes, omissions and additions may be made therein and thereto, without parting from the spirit and scope of the present invention.

What is claimed is:

1. A system for analyzing sound within a target area, comprising:
    a camera array positioned at a first height above a target area, the camera array including a plurality of cameras oriented to identify the presence of one or more sound sources within the target area;
    a microphone array positioned at a second height above the target area, the microphone array including a plurality of microphones oriented to receive sound produced from within the target area;
    a non-transitory computer storage media coupled with a computing device and encoded with one or more computer programs for analyzing sound sources and sound produced within the target area, the one or more computer programs including:
        a direction of arrival (DOA) estimation module configured to estimate a sound vector oriented towards a highest received energy level emitted from within the target area by iteratively sampling a sound energy level frame captured by the microphone array;
        a sound source identification module configured to identify within the target area captured by the camera array one or more sound source positions including sound source location and a radius around the sound source location;
        a sensor fusion module configured to convert the sound vector and the sound source location into a common data representation; and
        an association module configured to associate a produced sound corresponding to the sound vector with an active sound source having a radius in alignment with the sound vector, wherein the DOA estimation module includes one or more signal gates configured to:
  discard sound vectors outside the interquartile range of estimated sound vectors, or
  discard sound vectors that do not exceed an ambient noise threshold.

2. The system according to claim 1, wherein DOA estimation module is configured to:
  generate a first plurality of beam steering vectors from the microphone array;
  identify a first highest received energy level in a first beam steering vector from the first plurality of beam steering vectors;
  generate a second plurality of beam steering vectors within a first space surrounding the first beam steering vector;
  identify a second highest received energy level in a second beam steering vector from the second plurality of beam steering vector;
  generate a third plurality of beam steering vectors within a second space surrounding the second beam steering vector, the second space being smaller than the first space;
  identify a third highest received energy level in a third beam steering vector from the third plurality of beam steering vectors;
  iteratively generate additional pluralities of beam steering vectors with additional reduced-area spaces surrounding the beam steering vector having the highest received energy level and identifying the associated highest received energy levels additional beam steering vectors until the highest received energy level of the beam steering vector estimates the global maximum energy level from within a sound energy level frame; and
  estimate the sound vector as the beam steering vector associated with the global maximum energy level.

3. The system according to claim 2, wherein the DOA estimation module maintains the sound vector associated with the global maximum energy level until another sound vector is estimated or a hold time is exceeded.

4. The system according to claim 3, wherein the hold time is about 200 ms.

5. The system according to claim 1, wherein the DOA estimation module estimates a sound vector at a rate between about 40 kHz and about 100 kHz.

6. The system according to claim 1, wherein one of the one or more signal gates includes an angular distance gate configured to discard sound vectors without a corresponding potential sound source identified by the sound source identification module.

7. The system according to claim 1, wherein the DOA estimation module rejects sound energy level frames associated with a diffuse sound field.

8. The system according to claim 1, wherein the one or more computer programs further comprises:
  a beamforming module configured to save audio corresponding to the sound vector and discard audio not corresponding to the sound vector to produce a sound recording associated with the active sound source.

9. The system according to claim 1, wherein the first height and the second height are substantially equivalent.

10. The system according to claim 1, wherein the microphone array is mounted substantially concentrically within the camera array.

11. A method for analyzing sound within a target area, comprising:
  estimating a sound vector oriented towards a highest received energy level emitted from within a target area and captured by a microphone array positioned above the target area, the microphone array including a plurality of microphones oriented to receive sound produced from within the target area;
  discarding one or more sound vectors that are:
    outside the interquartile range of estimated sound vectors;
    below an ambient noise threshold; or
    without a corresponding sound source position,
  identifying one or more sound source positions within the target area and captured by a camera array including a plurality of cameras oriented to identify the presence of one or more sound sources within the target area, the sound source positions including a sound source location and a radius around the sound source location;
  converting the sound vector and the sound source location into a common data representation; and
  associating a produced sound corresponding to the sound vector with an active sound source having a radius in alignment with the sound vector.

12. The method according to claim 11, further comprising:
  producing a sound recording associated with the active sound source by saving audio corresponding to the sound vector and discarding audio not corresponding to the sound vector.

13. The method according to claim 11, further comprising maintaining the sound vector until another sound vector is estimated or a hold time is exceeded.

14. The method according to claim 13, wherein the hold time is about 200 ms.

15. The method according to claim 11, wherein the sound vector is estimated at a rate between about 40 kHz and about 100 kHz.

16. The method according to claim 11, further comprising:
  rejecting sound energy level frames associated with a diffuse sound field.

17. The method according to claim 11, wherein estimating a sound vector includes:
  capturing a sound energy level frame by the microphone array;
  generating a first plurality of beam steering vectors from the microphone array;
  identifying a highest received energy level in a first beam steering vector from the first plurality of beam steering vectors;
  generating a second plurality of beam steering vectors within a first space surrounding the first beam steering vector;
  identifying a second highest received energy level in a second beam steering vector from the second plurality of beam steering vector;
  generating a third plurality of beam steering vectors within a second space surrounding the second beam steering vector, the second space being smaller than the first space;
  identifying a third highest received energy level in a third beam steering vector from the third plurality of beam steering vectors;
  iteratively generating additional pluralities of beam steering vectors with additional reduced-area spaces surrounding the beam steering vector having the highest received energy level and identifying the associated highest received energy levels additional beam steering vectors until the highest received energy level of the beam steering vector estimates the global maximum energy level from within a sound energy level frame; and estimating the sound vector as the beam steering vector associated with the global maximum energy level.

18. A method for analyzing sound within a target area, comprising:

estimating a sound vector oriented towards a highest received energy level emitted from within a target area and captured by a microphone array above the target area;

discarding one or more sound vectors that are:
outside the interquartile range of estimated sound vectors;
below an ambient noise threshold; or
without a corresponding sound source position, identifying via a camera array above the target area one or more sound source positions within the target area captured by the camera array, the sound source positions including a sound source location and a radius around the sound source location;

converting the sound vector and the sound source location into a common data representation;

associating a produced sound corresponding to the sound vector with an active sound source having a radius in alignment with the sound vector; and maintaining the sound vector until another sound vector is estimated or a hold time is exceeded, wherein the microphone array is positioned substantially coplanar with and concentrically within the camera array.

19. The method according to claim 18, further comprising:

producing a sound recording associated with an active sound source by saving audio corresponding to the sound vector and discarding audio not corresponding to the sound vector.

* * * * *